April 26, 1932. H. E. ALTGELT 1,855,785
TRACTOR OPERATED AGRICULTURAL IMPLEMENT
Filed Feb. 1, 1928 3 Sheets-Sheet 3
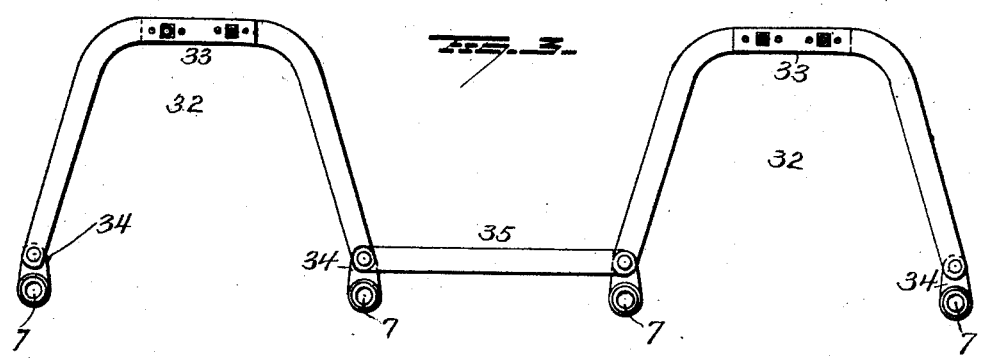
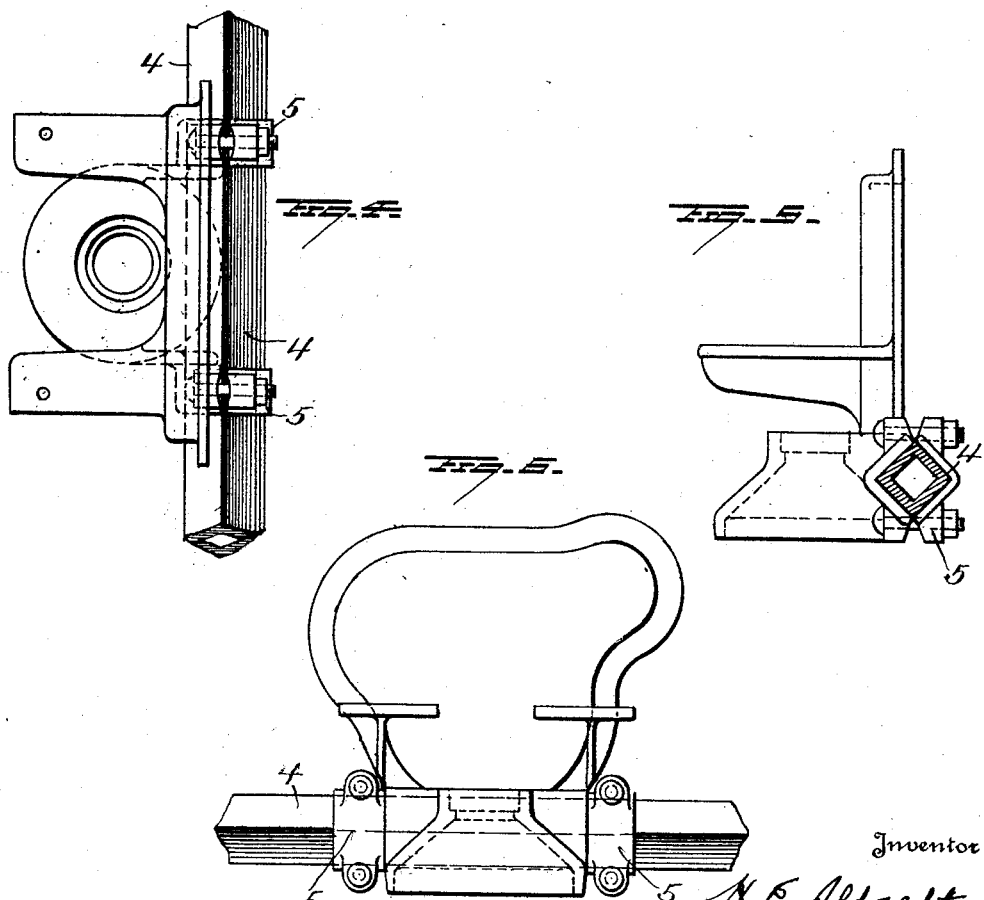

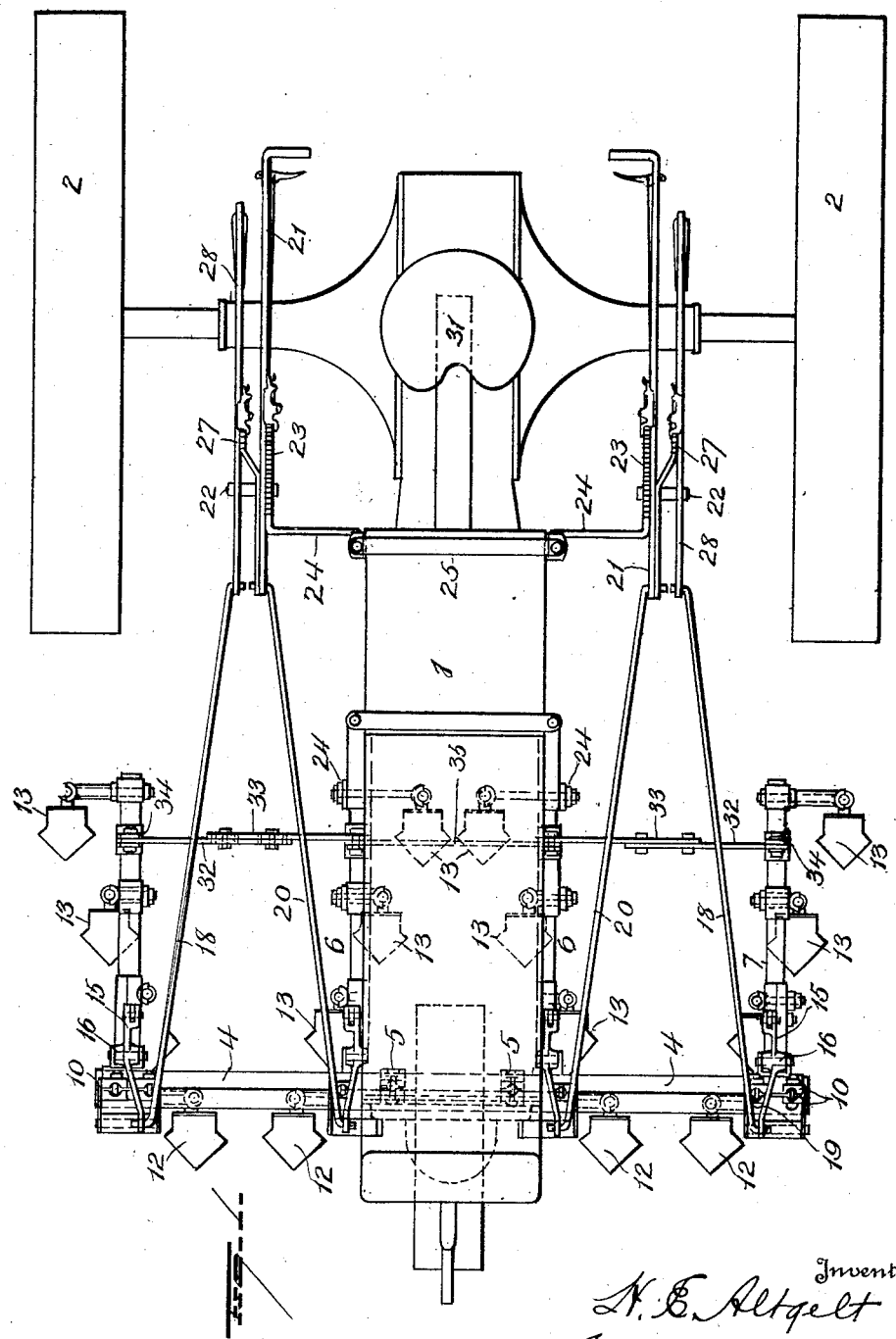

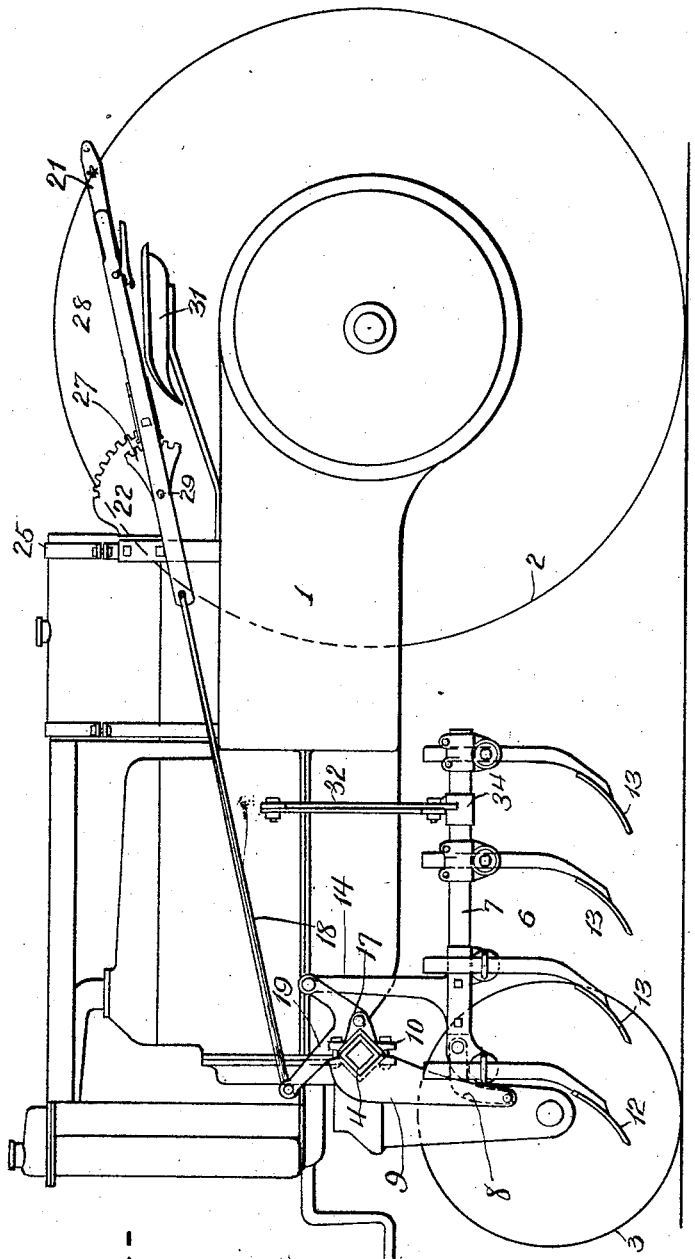

Patented Apr. 26, 1932

1,855,785

UNITED STATES PATENT OFFICE

HERMAN E. ALTGELT, OF SOUTH BEND, INDIANA, ASSIGNOR, BY MESNE ASSIGNMENTS, TO OLIVER FARM EQUIPMENT COMPANY, A CORPORATION OF DELAWARE

TRACTOR OPERATED AGRICULTURAL IMPLEMENT

Application filed February 1, 1928. Serial No. 251,117.

This invention relates to improvements in tractor operated agricultural implements and more particularly to improved soil working attachments for tractors.

One object of the present invention is to provide simple and efficient means whereby soil engaging implements may be connected with a tractor of the three-wheel type in a manner to insure efficiency in operation of the implements.

A further object is to provide simple and efficient means whereby soil engaging elements may be connected with the forward portion of a tractor rearwardly of a line passing through the axis of the forward wheel, and which means will facilitate the vertical raising and lowering of the soil engaging devices.

A further object of the invention is to provide a novel and improved construction of a soil engaging implement mounting for a tractor in which the soil engaging tools are located in close proximity to the steering wheel of the tractor so that full advantage may be taken of the change of direction of travel of the front end of the tractor in guiding the soil engaging tools, and at the same time without interfering with the operation of steering the tractor.

A further object is to provide efficient means to hold the soil engaging implements in place relatively to each other and also to relieve the front beam connections of some of the strain that would otherwise come upon them, especially when turning at the ends of rows.

With these and other objects in view, the invention consists in certain novel features of construction and combinations of parts as hereinafter set forth and pointed out in the claims.

In the accompanying drawings;

Figure 1 is a plan view showing an embodiment;

Figure 2 is a view in side elevation;

Figure 3 is a view showing the connecting devices for the soil engaging implements, and Figures 4, 5 and 6 are detail views.

A tractor is indicated at 1 and, in the present instance, is of that type having rear tractor wheels 2 and a single forward ground wheel 3 located under the forward end portion of the tractor and so mounted that it may be employed for steering purposes, through the medium of any suitable steering mechanism, not shown.

A transversely disposed beam 4 is secured to the tractor under the engine housing and a short distance rearwardly of a line passing through the axis of the front wheel 3. In the present instance, the transverse beam 4 consists of a tube made angular in cross section and it extends laterally beyond the respective sides of the body of the tractor, the ends of said beam terminating approximately in line with the treads of the rear traction wheels, and said beam is secured to the tractor by suitable clamps 5.

Located at each side of the tractor is a plurality of soil engaging implements. In the present instance, a series of cultivator gangs 6 is located at each side of the tractor. In the drawings, are shown two cultivator gangs at each side of the tractor but it will be understood that a greater number may be employed if desired. The front end of the beam 7 of each cultivator gang is connected, through the medium of an approximately L-shaped link 8, with the lower end of an arm 9, the upper end of which is secured to the tubular transverse beam 4 by means of a clamp 10. The beam 4 is located rearwardly of and in close proximity to the swivel bracket of the front steering wheel 3, and the arm 9 is secured to the forward side of the beam 4 so as to bring the forward ground engaging tool to a position in close proximity to the front steering wheel axis so that full advantage may be taken of the change of direction of the forward end of the tractor. By reference to Fig. 2 of the drawings, it will be seen that the downwardly projecting arm of the L-shaped link 8 is pivoted to the lower end of the arm 9, while the rearwardly projecting arm of said link is pivotally connected with the forward portion of the gang beam 7 preferably somewhat rearwardly of the forward extremity of said beam. This arrangement provides a flexible mounting for the cultivator gangs and permits the same to retain a horizontal position when being raised or lowered, and also permits this adjustment to be made notwithstanding the gangs are held in close proximity to the steering wheel. The standard 11 of the forward cultivator shovel 12 is connected with the forward extremity of the beam 7 and the shovel 12 projects forwardly beyond the axis of the front steering wheel 3, while the other shovels 13 of each gang are located behind said axis. Thus it will be seen that each cultivator gang, with the exception of the front shovel, is located rearwardly of the axis of the front wheel 3. By so locating the gangs, they are brought close to the front steering wheel without interfering with the steering operation so that the power of the tractor is most advantageously utilized, and full advantage is taken of the change of direction of the front end of the tractor, in steering the same, for guiding the tools between the rows of crop without the necessity of laterally shifting the tools upon the tractor.

It will be observed by reference to Fig. 1 of the drawings, that the shovels of each gang are so arranged that they will be offset laterally with respect to each other, so that certain shovels of each outer gang will be disposed in line with the tread of one of the rear tractor wheels with the forward shovels 12 of the outer gangs located inwardly of a line passing through the treads of the rear tractor wheels. The offsetting or staggering of the shovels of each inner gang will cause certain of the shovels to be disposed under the body of the tractor, while the forward shovel of each inner gang will be located in a line laterally removed from the tractor body.

By connecting the forward ends of the cultivator beams with the transverse beam 4 through the medium of the members 8 and 9 as above described, each cultivator gang may be raised vertically by means of power applied to the forward portions of the beams and the same mechanism (hereinafter described) may be utilized for raising or lowering the cultivator gang and for supporting the same in a horizontal position so that all the shovels of the gang will penetrate the ground to a uniform depth while when the gangs are raised all parts thereof will be clear of the ground. The primary function of the L-shaped link 8 is to permit the forward end of the gang beam 7 to swing upwardly and forwardly toward the arm 9, thereby permitting a greater clearance between the tools and the ground when the tools are in their non-working position. The raising, lowering and supporting mechanism to which allusion is above made, will now be described in detail. An arm or post 14 is made rigid with and projects upwardly from the forward portion of each cultivator gang beam and at its upper end, said arm or post has pivotally connected thereto, the rearwardly projecting arm 15 of a bell-crank lever 16 pivoted to a bracket 17 projecting rearwardly from each clamp 10. In the embodiment of the invention shown in the drawings, in which two cultivator gang beams are shown at each side of the tractor, a rod 18 is connected with the arm 19 of each bell-crank 16 which is connected with an outer cultivator gang, and a rod 20 is connected with the arm 19 of each bell-crank 16 which is connected with an inner cultivator gang. Each rod 20 is connected with one end of a hand lever 21, pivotally connected between its ends, as at 22, to a toothed segment 23 carried on an arm or bracket 24 secured to the rear portion of the tractor body by means of a clamping band 25, said hand lever 21 being provided with a suitable detent for cooperation with the toothed segment 23. A toothed segment 27 is suitably secured to each lever 21 and hand levers 28, each pivoted as indicated at 29, carry suitable detents for cooperation with the segments 27, the forward arms of said levers 28 having the rods 18 connected therewith. With such construction, the cultivator gangs at each side of the tractor may be separately manipulated or they may be raised or lowered simultaneously, and the hand levers are arranged within convenient reach of an operator riding on a seat 31 over the rear portion of the tractor.

In order that the cultivator beams or soil-engaging implements shall be held properly in place and suitably spaced, the cultivator beams of each pair are connected by means of yokes or arches 32, (Fig. 3) each arch or yoke comprising two members adjustably connected together as indicated at 33, and the arms of the yokes being connected with the cultivator beams through the medium of brackets 34 projecting from the beams and with which brackets the yoke arms are pivotally connected. The two yokes 32 and hence the inner cultivator beams of the respective pairs are connected by a link 35 which passes under the body of the tractor. By making the connections between the cultivator beams of each pair in the form of yokes, ample space is provided to permit such connections to pass over the growing plants without conflict therewith. The connecting devices above described serve not only to properly space or adjust the cultivator gangs, but also to relieve the front beam connections of some of the strain that would otherwise come upon them, especially when turning at the ends of rows, the pivotal connections to the brackets 34 imparting desired flexibility.

Having fully described my invention, what I claim as new and desire to secure by Letters Patent is:—

1. The combination of a tractor, a transverse beam secured to the forward portion of the tractor and disposed adjacent and rearwardly of the front wheel axis thereof, a cultivator beam supported by said transverse beam, a plurality of soil engaging elements carried by said beam, the forward soil-engaging element projecting forwardly beyond the front wheel axis of the tractor and other of said soil engaging elements disposed wholly in rear of the front wheel axis of the tractor.

2. The combination of a tractor, a transverse beam rigidly secured to the forward portion of the tractor and rearwardly of the front wheel axis thereof, an arm depending from and positioned forwardly of said beam, a soil engaging implement, and a link having one end pivoted to the lower portion of said arm and its opposite end pivoted to the forward portion of said soil-engaging implement.

3. The combination of a tractor, a transverse beam secured to the forward portion of the tractor in rear of the front wheel axis thereof, an arm depending from and positioned forwardly of said beam, a soil engaging implement and means connecting the forward portion of said implement with said arm whereby said implement is moved toward said arm when the implement is elevated to its inoperative position.

4. The combination of a tractor, a transverse beam rigidly secured to the forward portion of the tractor in rear of the front wheel axis thereof, an arm depending from said beam and rigidly secured thereto, a soil engaging implement, and means connecting the forward portion of said implement with said arms, said means comprising an L-shaped link pivoted to said arm and to said soil-engaging implement whereby said implement may properly clear the ground in its elevated position.

5. The combination of a tractor, a transverse beam secured to the forward portion of the tractor in rear of the front wheel axis thereof, an arm depending from said beam, a soil engaging implement, and means connecting the forward portion of said implement with said arm, said means comprising an angular link having a downwardly projecting portion pivoted to said arm and a rearwardly projecting portion pivoted to said soil engaging implement whereby said implement may be unobstructedly elevated to its non-operative position.

6. The combination of a tractor, a transverse beam rigidly secured to the forward portion thereof, an arm depending from said beam, a soil engaging implement, and a pivoted link connecting the lower portion of said arm with the forward portion of said soil-engaging implement, said link having a downwardly projecting portion pivoted to said arm and a rearwardly projecting portion pivoted to said soil engaging implement whereby said implement may properly clear the ground in its elevated position.

7. The combination of a tractor, a transverse beam rigidly secured to the forward portion thereof, an arm depending from said beam, a soil-engaging implement, a pivoted link connecting the lower portion of said arm with the forward portion of said soil-engaging implement, a post secured at its lower end to said soil-engaging implement, and lever operated means pivoted to said transverse beam and connected with said post for adjusting and supporting said soil-engaging implement.

8. The combination of a tractor, a transverse beam secured to the forward portion thereof, an arm depending from said beam, a soil engaging implement, a pivoted link connecting the lower portion of said arm with the forward portion of said soil-engaging implement, a post projecting upwardly from the forward portion of the soil-engaging implement, a bell-crank lever supported by the tractor and having one of its arms connected with said post, a manually operated lever, and a connection between the latter and the other arm of the bell-crank lever.

9. The combination of a tractor, a transverse beam secured to the forward portion thereof, two soil-engaging implements, arms depending from said beam, link connections between said arms and the forward portions of said soil-engaging implements, posts rising from the forward portions of said soil-engaging implements, bell-crank levers supported by the tractor and connected with the posts on the soil engaging implements, two manually operated levers connected respectively with the respective bell-crank levers, and means whereby said manually operated levers may be operated separately or simultaneously.

10. The combination with a tractor, of a transverse beam secured to the forward portion thereof rearwardly of the front wheel axis and projecting laterally in both directions beyond the body of the tractor, depending arms secured to said beam at both sides of the tractor, soil engaging implements, links connecting the forward portions of said implements with the lower portions of said arms, bell-crank levers supported by the tractor at each side of the latter, posts on the forward portions of the soil-engaging implements and connected with said bell-crank levers, manually operated levers at both sides of the tractor and connected with said bell-crank levers.

11. The combination with a tractor, of a transverse beam secured to the forward portion thereof, a plurality of pivotally supported soil-engaging implements, connected to said beam on the opposite sides of said tractor, yokes connecting said implements and spacing them apart, and a link extending beneath said tractor connecting the implements on the opposite sides of the tractor together.

12. The combination of a tractor, of a transverse beam secured to the forward portion thereof a plurality of pairs of pivotally supported soil-engaging implements carried by said beam, of yokes connecting the implements of the respective pairs, and means extending beneath said tractor connecting said yokes and the respective pairs of soil-engaging implements.

13. An agricultural attachment for tractors, comprising a beam, means to secure said beam to the forward portion of a tractor transversely thereof, an arm depending from said beam, a soil-engaging implement, a post on the forward portion thereof, a link connection between the forward portion of said implement and the lower portion of said arm, a bell-crank lever supported on said beam, a manually operated lever, a connection between the last-mentioned lever and one arm of said bell-crank lever, and a pivotal connection between the other arm of said bell-crank lever and the post on the soil-engaging implement.

14. The combination with a tractor and a plurality of pairs of earth-working gangs connected to and adjacent the forward portion of said tractor, of connecting devices between the earth-working gangs of each pair, and connecting means connecting the first-mentioned means and extending transversely under the tractor.

15. The combination with a tractor and pairs of earth-working gangs connected adjacent the forward portion of said tractor, of connecting means between the gangs of each pair, and flexible means connecting the connected pairs of gangs, said last-mentioned means extending transversely under the tractor.

16. The combination with a tractor and pairs of earth-working gangs connected adjacent the forward portion of said tractor, of arched connecting means between the gangs of each pair and flexible means including a link pivoted to each pair of gangs, said last named means extending transversely under the tractor.

17. The combination with a tractor and pairs of earth-working gangs connected adjacent the forward portion of said tractor, of adjustable arched members connected between the gangs of each pair and flexible means extending under the tractor for connecting each pair of gangs whereby each pair of gangs may be independently raised or lowered.

18. The combination of a tractor, a transverse beam rigidly secured to the forward portion of the tractor in rear of the front wheel axis thereof, an arm depending from said beam and rigidly secured thereto, a soil engaging implement comprising a beam and a plurality of cultivating shovels attached thereto, and a link connecting the forward portion of said beam to said arm, one of said shovels being positioned forwardly of the connection between said link and said beam.

19. The combination of a tractor, a transverse beam rigidly secured to the forward portion thereof, an arm depending from and positioned forwardly of said beam, a soil engaging implement including a tool beam having ground engaging shovels attached thereto, and a link having one end pivoted to said arm and the other end thereof pivoted to said tool beam, one of said shovels being attached to said tool beam in advance of the pivotal connection of said tool beam with said link.

20. The combination of a tractor, a transverse beam secured to the forward portion thereof, an arm depending from said beam, a tool beam adjustably secured to said first named beam and arm, a parallel link mechanism connecting said first named beam to said arm, and shovels attached to said tool beam, certain of said shovels being positioned in advance of the pivot of said tool beam with one of the links of said parallel link mechanism.

21. The combination with a tractor and a beam secured thereto and projecting laterally from its forward portion, of a hanger secured to said beam and having a depending arm, an earth working structure including a beam and a bracket secured to the forward portion of said last mentioned beam, said bracket having an upwardly projecting post, a pivoted link connection between said first mentioned beam and the upper portion of said post, a link connection between said second named beam and the depending arm of said hanger, and means for raising and lowering said earth working structure.

In testimony whereof, I have signed this specification.

HERMAN E. ALTGELT.